Figure 1:
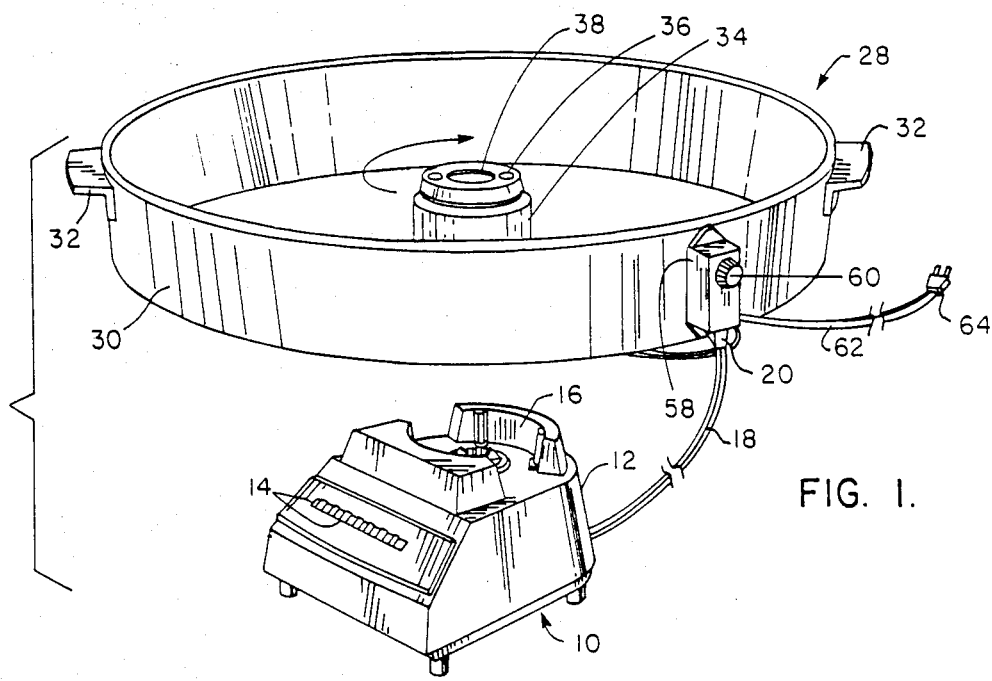

United States Patent [19]

Bray et al.

[11] Patent Number: 4,501,538
[45] Date of Patent: Feb. 26, 1985

[54] COTTON CANDY ACCESSORY FOR BLENDER

[76] Inventors: Carl R. Bray, 503 S. Green St.; Lee Cueni, 500 E. 3rd, Apt. 5, both of Lees Summit, Mo. 64063

[21] Appl. No.: 389,443

[22] Filed: Jun. 17, 1982

[51] Int. Cl.³ ............................................. B28B 17/00
[52] U.S. Cl. ........................................ 425/9; 99/348; 219/432; 219/214; 219/386; 219/441; 366/146; 425/143; 425/162; 426/660; D7/413
[58] Field of Search ............... 219/209, 386, 214, 389, 219/429, 400, 432, 433, 436, 438, 441; 425/9, 425/143,162; 426/515, 516, 660; 310/232; D7/413, D7/376; 378; 384, 386; 241/185 R; 49/348; 366/146, 197, 220, 231, 232; 337/313

[56] References Cited

U.S. PATENT DOCUMENTS

| | | | |
|---|---|---|---|
| 1,489,342 | 4/1924 | Brent | 425/9 |
| 1,806,111 | 5/1931 | Moad | 425/9 |
| 2,198,152 | 4/1940 | Cooley et al. | 425/9 |
| 2,804,289 | 8/1957 | Schwaneke | D7/378 X |
| 2,905,452 | 9/1959 | Appleton | 219/429 X |
| 3,019,745 | 2/1962 | Du Bois et al. | 425/9 |
| 3,118,396 | 1/1964 | Brown et al. | 425/9 |
| 3,118,397 | 1/1964 | Brown et al. | 425/9 |
| 3,537,691 | 11/1970 | Tsuruta et al. | 336/129 |
| 3,930,043 | 12/1975 | Warming et al. | 426/516 X |
| 4,173,925 | 11/1979 | Leon | 99/348 |

Primary Examiner—Volodymyr Y. Mayewsky
Attorney, Agent, or Firm—Kokjer, Kircher, Bradley, Wharton, Bowman & Johnson

[57] ABSTRACT

An attachment for use with a household blender to convert the blender to a cotton candy making machine is the subject of the present invention. An open top container is provided with a rotatable hopper for receiving the candy making ingredients including sugar. A heating element proximate to the hopper melts the sugar. A drive shaft is coupled with the hopper and is adapted to be coupled with the drive coupling on the blender motor. Thus, when the blender is turned on, the hopper rotates causing the melted sugar and other ingredients to be directed through orifices in the hopper out into the bowl. The spun candy may then be worked into a ball utilizing a stick on which the candy is gathered.

4 Claims, 2 Drawing Figures

U.S. Patent   Feb. 26, 1985   4,501,538

COTTON CANDY ACCESSORY FOR BLENDER

BACKGROUND OF THE INVENTION

This invention relates generally to cotton candy making machines and, more particularly, to a cotton candy making accessory for a household blender.

Cotton candy making machines have been popular for at least 50 years. A typical cotton candy forming machine is shown and described in U.S. Pat. No. 1,806,111 issued to Moad May 19, 1931. Other more recent patents are the Du Bois et al., U.S. Pat. No. 3,019,745; Brown et al., U.S. Pat. No. 3,118,396; and Brown et al., U.S. Pat. No. 3,118,397. All of the devices of the prior art are characterized by rotating hoppers disposed in a bowl mounted on a base and adapted to receive sugar, flavoring and coloring. A heating element melts the sugar and as the device rotates, the sugar is dispersed around the edge of the bowl where it is then picked up in the form of cotton candy.

None of the prior art devices provided for quick removal of the bowl in which the candy is made, thus complicating cleaning of the device. Furthermore, none of the prior art devices in any way contemplates adapting a household blender to a cotton candy making machine.

Because prior art cotton candy making machines have consisted of complete self-contained units including motor, heating element and bowl, they have been relatively expensive and not within reach of the average consumer. Another disadvantage of the prior art constructions has been that the integral bowl, motor and heating element assembly is difficult to clean and store.

OBJECTS OF THE INVENTION

It is, therefore, a primary object of the present invention to provide an attachment for adapting a household blender to a cotton candy making machine.

As a corollary to the above object, a primary aim of the invention is to provide a blender attachment which can be used to make cotton candy that in no way requires alteration of the blender, thus permitting it to be used as a conventional blending machine when not utilized for forming cotton candy.

Another one of the objects of my invention is to provide a cotton candy forming machine which, by utilization of a household blender base, is much more economical than existing cotton candy making machines.

A further objective of the invention is to provide a cotton candy making machine which, by virtue of having a removable bowl, is more easily cleaned and stored than conventional cotton candy making machines.

Figure 2:
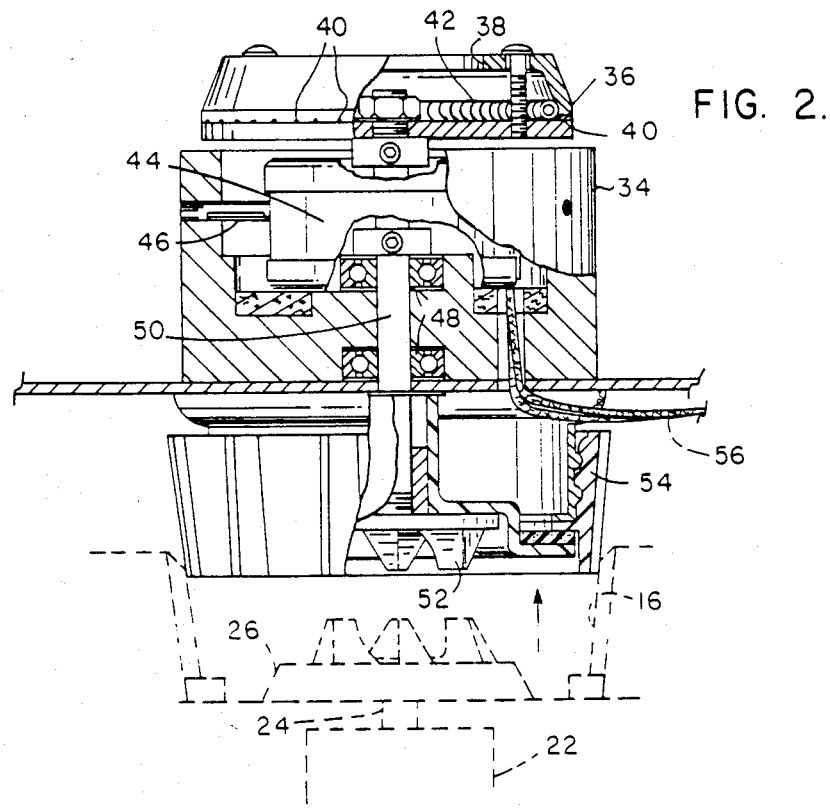

Other objects of the invention will be made clear or become apparent from the following description and claims when read in light of the accompanying drawing wherein:

FIG. 1 is a perspective view of the cotton candy making attachment of the present invention together with a typical household blender base with which the attachment would be utilized; and FIG. 2 is an enlarged vertical cross-sectional view, with portions shown in elevation, of the attachment of the present invention.

Referring to the drawing, a household blender base is designated by the numeral 10 and includes a housing 12, control buttons 14 and a recessed housing portion 16.

An electrical supply cord 18 having a plug 20 supplies current to a motor 22 inside of housing 12. Motor 22 has a drive shaft 24 with a drive coupling 26 secured to the end of the shaft.

The attachment of the present invention is designated generally by the numeral 28 and comprises a relatively large diameter open top bowl 30 with handles 32 disposed on the outside of the bowl.

A housing 34 is coupled with bowl 30 at the center thereof and mounts a hopper 36 having an opening 38. A plurality of very small orifices 40 extend around the perimeter of hopper 36. A flow restricter in the form of a coil spring 42 is placed on the inside of the hopper in front of orifices 40.

Housing 34 encloses a heating element 44 which is held in place by a plurality of set screws 46. Bearing assemblies 48 disposed in the housing 34 mount a drive shaft 50 which extends through the housing. An end coupling 52 on shaft 50 is complemental to the drive coupling 36 aforedescribed. The lower portion of housing 34 also mounts a base portion 54 which is complemental to recessed housing portion 16. Electrical wiring 56 delivers current to heating element 44 and is coupled with a resistance 58 mounted on the side of bowl 30. A control switch 60 is used to turn off and on the current passing through resistance 58. Resistance 58 is also adapted to receive plug 20 and a supply line 62 extending from resistance 58 includes a plug 64 for coupling with an electrical outlet.

OPERATION

The attachment of the present invention is utilized by coupling plug 20 with resistance 58 and plug 64 with a conventional power supply. Base 54 is carefully positioned in recessed portion 16 of the housing 12. The attachment 28 is turned so as to bring coupling 52 into driving engagement with coupling 26. Switch 60 is turned on to provide current to heating element 44 and the ingredients for making cotton candy are poured into the hopper 36 through opening 38. These ingredients normally include ground sugar, flavoring and coloring. Blender motor 22 is turned on utilizing control buttons 14 thus causing hopper 36 to rotate and the melted ingredients to be driven through orifices 40 by centrifugal forces. The spun sugar will collect on the inner wall of bowl 30 where it can be wrapped around a stick to form a larger ball. It is to be understood that resistance 58 causes motor 22 to run at a slightly slower speed than would otherwise be possible.

Cleaning and storage of the cotton candy making machine of the present invention is simplified by virtue of the fact that bowl 30 is simply lifted off of housing 12 after electrical connections 20 and 64 have been unplugged. Heating element 44 is preferably sealed watertight in housing 34 so that the entire bowl may be submerged and washed. By utilizing blender 10, an economical cotton candy making machine may be provided for the average home owner. Maintenance expense and storage in convenience will be minimized as a result of the removable bowl which utilizes the blender motor for power.

We claim:

1. An attachment for use with a household blender, said blender being characterized by a motor, a motor drive shaft and a drive coupling on the end of said shaft, said attachment comprising:

an open top container having an opening in the center of the container bottom;

rotatable hopper means mounted in the center of said container and adapted to receive the ingredients, including sugar, for making cotton candy, said hopper means being characterized by a plurality of orifices for distributing said ingredients around said container under influence of centrifugal forces;

drive means coupled with said hopper means having a shaft projecting through said opening in the bottom of said container, said shaft having an end coupling which is complemental to the drive coupling on the end of said motor drive shaft, said end coupling and said motor drive shaft coupling being in driving engagement when the container is seated on the blender and disengaged when said container is lifted off of said blender; and a heating element disposed in close association with said hopper means for melting said sugar.

2. The invention in claim 1, wherein said attachment is to be used with a blender that includes a housing having a recessed portion for mounting said motor drive shaft coupling and wherein said attachment includes a base portion coupled with said container and complemental to said recessed portion of the housing for placement in the latter.

3. The invention of claim 1, wherein said attachment includes resistance means adapted to be electrically coupled with said motor for reducing the speed of the motor.

4. The invention of claim 3, wherein said resistance means comprises a variable resistance.

* * * * *